Jan. 24, 1956  L. F. LATIMER  2,732,034
VEHICLE JACK
Filed Dec. 7, 1954  2 Sheets-Sheet 2
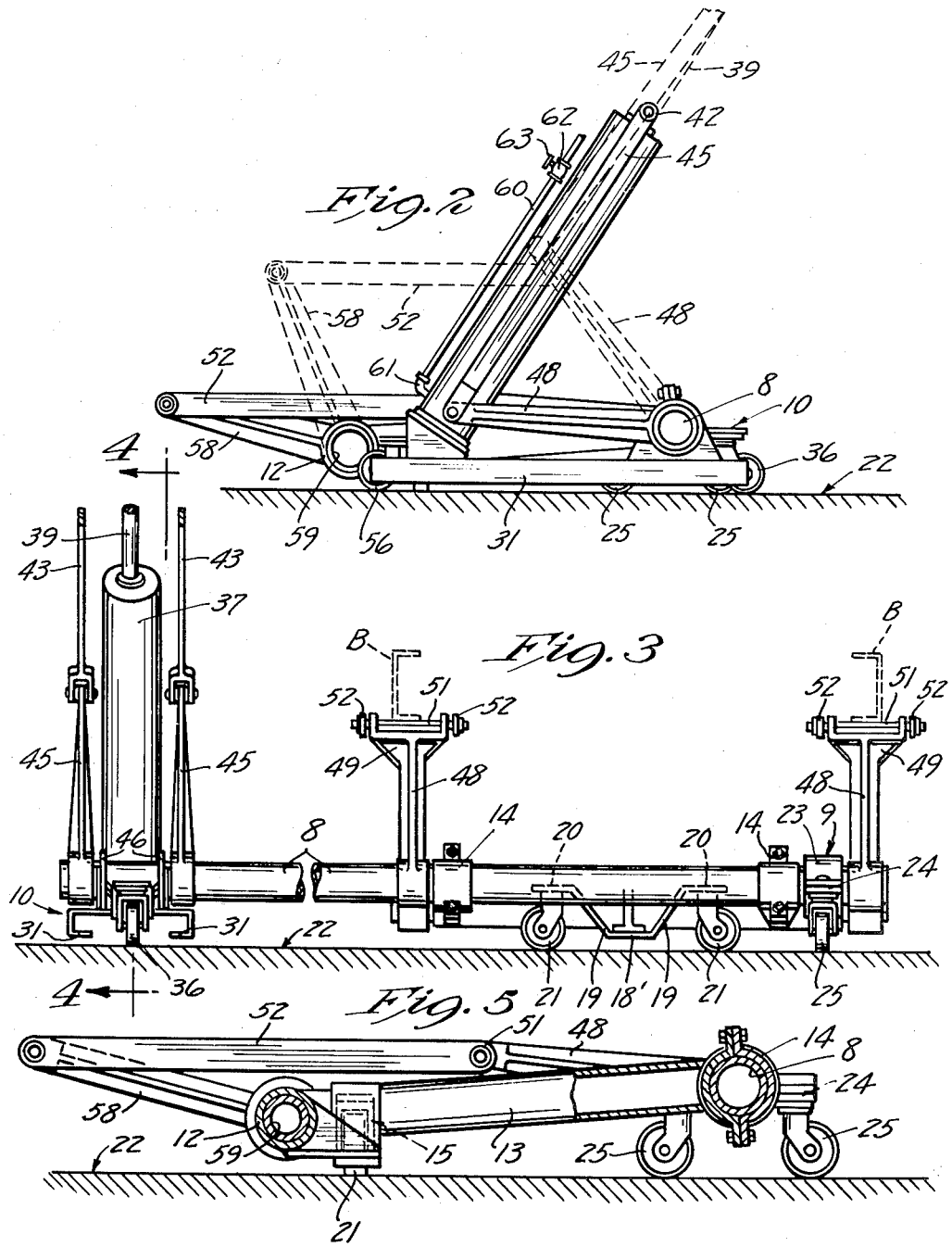
INVENTOR.
Louie F. Latimer
BY
Merchant & Merchant
ATTORNEYS

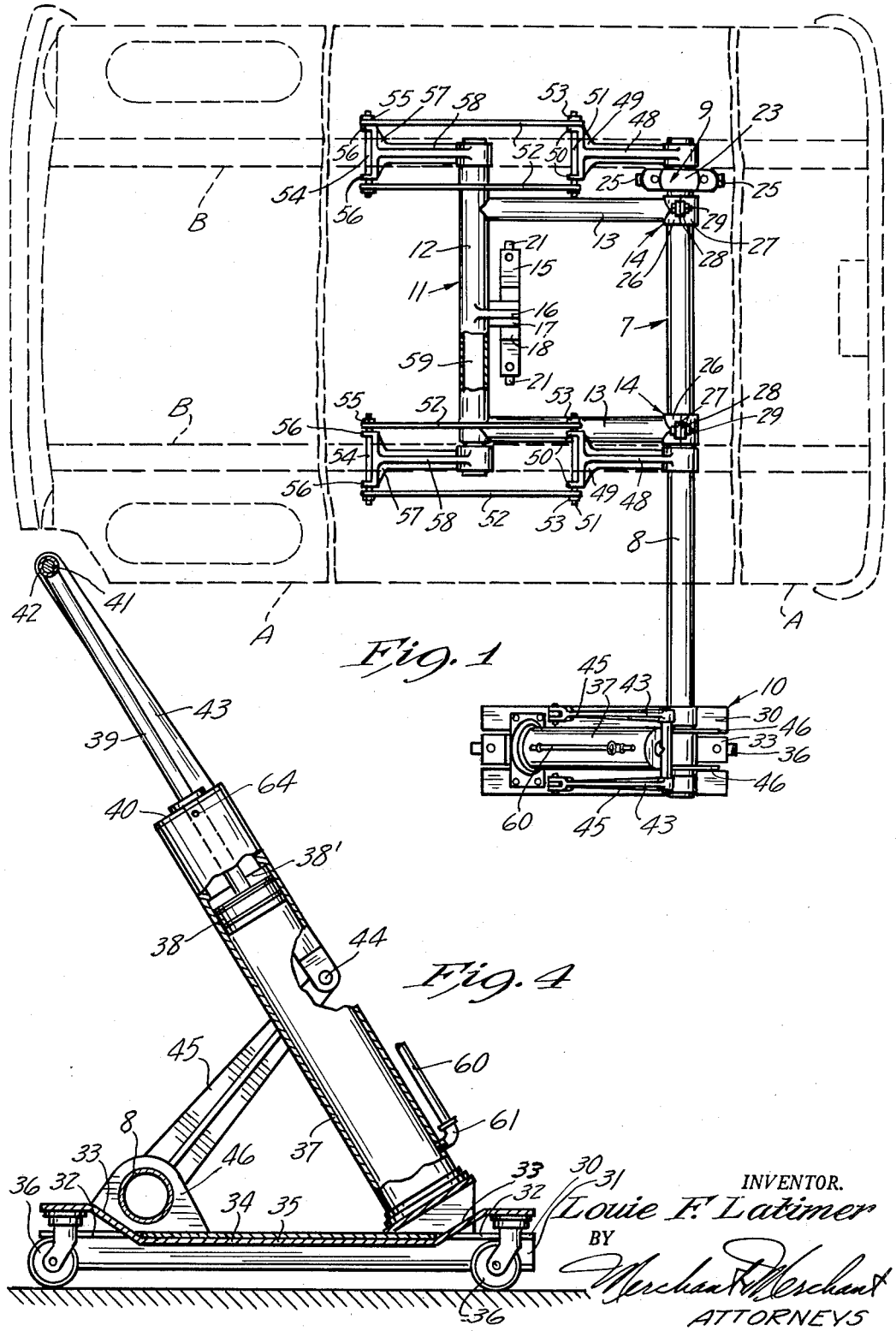

United States Patent Office 2,732,034
Patented Jan. 24, 1956

2,732,034
VEHICLE JACK

Louie F. Latimer, Gainesville, Fla.

Application December 7, 1954, Serial No. 473,502

4 Claims. (Cl. 187—8.72)

My invention relates to improvements in vehicle lifts or jacks and, more particularly, to improvements in structures of the class described which apply lifting force to the frame of a vehicle, rather than to the bumper or any part of the running gear of the vehicle, whereby all four wheels of the vehicle may be elevated from the ground at one time.

This application is a continuation-in-part of my pending application, Serial No. 387,203, filed October 20, 1953 and now abandoned, and entitled "Vehicle Jack."

A primary object of my invention is to provide a structure which may be utilized in a relatively small space and, to this end, I provide a novel combination and arrangement of parts whereby the power-operated mechanism for raising the lifting arms is located adjacent one side of the vehicle, and no part of the lifting structure is disposed forwardly or rearwardly of the vehicle.

A still further object of my invention is the provision of a device of the class above described which is readily transportable and which may be operated with a minimum of skill.

A still further object of my invention is the provision of a device of the class described which incorporates a minimum of working parts, is rugged in construction and durable in use, and is relatively inexpensive to produce.

The above and still further objects of my invention will become apparent from the following detailed specification, appended claims and attached drawings.

Referring to the drawings wherein like characters indicate like parts throughout the several views:

Fig. 1 is a top plan view of my novel structure, some parts being broken away and some parts shown in section, and illustrating its use on the vehicle shown in dotted lines;

Fig. 2 is an end elevation, the jack being shown in full lines in depressed position;

Fig. 3 is a side elevation, taken from the left of Fig. 1;

Fig. 4 is a fragmentary transverse vertical section, taken on the line 4—4 of Fig. 3; and Fig. 5 is a transverse vertical section, taken on the line 5—5 of Fig. 1.

Referring to the drawings wherein like numerals designate like parts throughout the several views:

The illustrated lift or jack comprises an articulated frame 7, which comprises a torque tube or shaft 8, which is substantially longer than the width of vehicles A, with which the jack is to be used, a floor-engaging bearing 9 at one end of the shaft 8, a floor-engaging base 10 at the other end of the shaft 8, and a generally U-shaped frame element 11, which includes a tubular bight portion 12 and parallel tubular legs 13, 13, terminating in split collars 14, 14, which loosely engage around the shaft 8 near the bearing 9 and journal said shaft 8 for rotation. The bight portion 12 of the frame element 11 has a floor-engaging element 15.

The said floor-engaging element 15 comprises, as particularly well shown in Figs. 1, 3 and 5, a rigid inverted T beam strut 16 which projects from the bight portion 12 toward the shaft 8 at the center of the bight portion 12, the head or flange 17 of the strut 16 being downward. A V-shaped leaf spring 18 has a flattened center portion 18' fixed to the underside of the head 17 and upwardly divergent opposed arms 19, 19 which terminate in horizontal portions 20, 20 to whose undersides are secured casters 21, 21 which normally space the frame element 11 above and out of contact with the floor 22. However, whenever the weight of a vehicle is on the jack, the leaf spring 18 yields upwardly and permits the flattened center portion 19 to frictionally contact the floor 22 and thereby perform the dual function of adequately supporting the weight of a vehicle and resisting movement of the jack relative to the floor 22.

The bearing 9 comprises a journal 23 circumposed on the shaft 8, and having oppositely projecting leaf springs 24, 24 from which casters 25, 25 depend and normally support the journal 23 out of contact with the floor 22. When the jack is loaded, the leaf springs 24, 24 yield upwardly and permit the journal 23 to contact the ground 22.

The split collars 14, 14 on the free ends of the legs 13, 13 of the U-shaped frame element 11 comprise sections 26 fixed to the legs 13, 13 and separable sections 27, the sections 26 and 27 having lugs 28 which are traversed by assembling bolts 29. The collars 14, 14 loosely surround the shaft 8 so that the frame element 11 and the shaft 8 can turn freely relative to each other. The collars 14, 14 are split so that when desired, the frame element 11 can be removed as a component of the frame 7, as hereinafter indicated. As shown in Figure 1, one leg 13 of the frame element 11 abuts one side of the bearing 9 with the other leg 13 located near the midlength point of the shaft 8.

The floor engaging base 10 comprises a rectangular plate 30 having depending L-shaped side flanges 31. The opposite ends of the plate 30 are provided with notches 32, 32 through which project upwardly angulated end portions 33, 33 of a leaf spring 34 having a straight flat intermediate portion 35 secured against the underside of the plate 30, as shown in Figure 4.

The end portions 33, 33 have secured thereto depending casters 36, 36 which normally space the side flanges 31 out of contact with the floor 22. The weight of a vehicle on the jack will depress the side flanges 31 into supporting and frictional contact with the floor 22.

Fixed upon one end of the plate 30 of the base 10 is an inwardly and upwardly angulated pneumatic closed end cylinder 37 in which works a piston 38 having a piston rod 39 extending through the upper end 40 of the cylinder 37. The upper end of the piston rod 39 is fixed at 41 to the middle of a crosshead 42, on whose opposite ends are pivoted the upper ends of normally depending connecting rods 43, 43 positioned at opposite sides of the cylinder 37. The lower ends of the connecting rods 43, 43 are pivoted at 44, 44 to the free ends of radial arms 45, 45 whose other ends are fixed to the torque tube or shaft 8, at the outer sides of a pair of bearing lugs 46, 46 which rise from the plate 30 at the opposite end of the plate 30 from the cylinder 37 and at opposite sides of the related notch 32, the shaft 8 being journalled in the bearing lugs 46, 46.

For lifting engagement with the underside of chassis frame elements B of a vehicle A to be jacked up, the torque shaft 8 is provided with fixed primary radial lifting arms 48, 48 which project from the shaft 8 at the outer side of the inner split collar 14 and at the outer side of the bearing 9, as shown in Figure 1, whereby longitudinal shifting of the frame element 11 along the shaft 8 is precluded.

The lifting arms 48, 48 have crossheads 49, 49 on their free ends having bearing lugs 50, 50 at their opposite ends with pivot bolts 51, 51 journalled through the lugs 50, 50. Parallel spaced links 52, 52 have one end pivoted on the bolts 51, 51 outwardly of the lugs 50, 50 and nuts 53, 53 on the bolts retain the links removably on the bolts 51, 51.

The other ends of the links 52, 52 are removably pivoted on bolts 54, 54 similar to the bolts 51, 51 and are retained thereon by nuts 55, 55, the bolts 54, 54 being journaled in lugs 56, 56 on crossheads 57, 57 similar to the crossheads 49, 49. The crossheads 57, 57 are on the free ends of radial secondary lift arms 58, 58 which are fixed on opposite ends of a shaft 59 journaled in the tubular bight portion 12 of the frame element 11 and bear against the opposite ends of the bight portion 12. The primary lifting arms 48, 48 and the secondary lifting arms 58, 58 are substantially parallel to each other. The links 52, 52 and the crossheads 49, 49 and 57, 57 are arranged to liftingly engage portions of a vehicle chassis B for elevating the vehicle, such as a rear or front part of the chassis for elevating only the rear or front wheels of the vehicle, or to engage a part of the chassis B between the front and rear wheels for elevating both the front and rear wheels of the vehicle from the floor 22. When it is desired to elevate only the rear wheels or only the front wheels of vehicles A, the frame element 11 can be removed by disconnecting the collars 14, 14 from the torque shaft 8, and detaching the links 52, 52 from the primary lifting arm crossheads 49, 49. This leaves the crossheads 49, 49 for lifting engagement with the vehicle chassis B in the region of the front or rear wheels.

As shown in Figure 4, the cylinder 37 is provided with a stop flange 38' which limits upward travel of the piston 38 in the cylinder 37 so as to eliminate danger of the connecting rods 43, 43 and the radial arms 45, 45 moving as far as or beyond longitudinal alignment with each other, which might otherwise occur and permit the torque tube to reverse and drop a vehicle A from jacked-up position.

Operating pressure may be supplied to the cylinder 37 for driving the piston 38 upwardly to elevate a vehicle A present on the jack through a pipe 60, leading from a source of air pressure (not shown), the pipe 60 having an end entering the lower part of the cylinder 38 at a point below the piston 38, as indicated at 61. A spring loaded relief valve 62 can be incorporated in the pipe 60 having a manual operator 63 for relieving the pressure in the cylinder and thereby permitting the weight of a vehicle and/or that of the lifting arms to depress the jack from elevated position. An air relief hole 64 is provided in the upper part of the cylinder 37 above the piston 38 to eliminate resistance to upward movement of the piston 38.

My invention has been thoroughly tested and found to be completely satisfactory for the accomplishment of the above objects; and while I have shown a preferred embodiment hereof, I wish it to be understood that the same is capable of modification without departure from the spirit and scope of the invention as defined in the appended claims.

I claim:

1. In a device of the class described, a horizontally disposed torque shaft which is substantially longer than the width of a vehicle with which said device is to be used, a floor-engaging bearing on the inner end of said torque shaft, a floor-engaging base on the outer end of said torque shaft, leg structure journalled to and projecting laterally from said torque shaft in a direction longitudinally of the vehicle, a pair of lifting arms secured at their inner ends to said torque shaft one adjacent the inner end thereof and the other to the intermediate portion thereof, a pair of secondary lifting arms pivotally secured at their inner ends to said leg structure in spaced relation to said torque shaft for swinging movements about a common axis parallel to the torque shaft axis, and each in a plane parallel to the planes of movement of said first-mentioned lifting arms, rigid links connecting the outer end portion of each of said lifting arms with the outer end portion of a cooperating one of said secondary lifting arms, said base extending laterally from the outer end of said torque shaft in the same direction as said leg structure, and power operated mechanism on said base for imparting rotary movement to said torque shaft in an upward direction to cause engagement of the extended ends of said lifting arms with the frame of a vehicle.

2. The structure defined in claim 1 in which said leg structure includes a pair of spaced legs rigidly journalling at their inner ends said torque shaft, and a connecting bight member rigidly secured to the outer ends of said legs, said secondary lifting arms being pivotally secured to opposite ends of said bight member.

3. The structure defined in claim 1 in which said power operated means includes a crank arm on the outer end of said torque shaft overlying said base, a fluid pressure cylinder and cooperating plunger-equipped piston, one of which is connected to the base, and means connecting the other thereof to the free end of said crank arm.

4. The structure defined in claim 3 in which said cylinder is rigidly secured to the outer end of said base and extends generally in the direction of swinging movement of said crank arm, said last-mentioned means comprising a crosshead pivotally connected at its opposite ends to said plunger and crank arm, whereby outward movements of said plunger will impart torque shaft rotating movement to said crank arm in a direction to raise the outer ends of said lifting arms.

No references cited.